United States Patent [19]

Leonardo et al.

[11] Patent Number: 4,928,096
[45] Date of Patent: May 22, 1990

[54] PAGING TERMINAL APPARATUS WITH MESSAGE STORAGE AND RETRANSMISSION CAPABILITY AND METHOD THEREFOR

[75] Inventors: Victoria A. Leonardo; Leonard E. Nelson, both of Boynton Beach, Fla.

[73] Assignee: Motorola, Inc., Schaumburg, Ill.

[21] Appl. No.: 338,453

[22] Filed: Apr. 17, 1989

Related U.S. Application Data

[63] Continuation of Ser. No. 121,362, Nov. 16, 1987, abandoned.

[51] Int. Cl.$^5$ .............................................. H04Q 9/00
[52] U.S. Cl. ........................ 340/825.440; 340/825.08; 340/825.48; 340/825.52; 370/95.2
[58] Field of Search ...................... 370/93, 85.6, 95.2; 455/31; 358/147; 340/825.44, 825.47, 825.48, 825.08, 825.52

[56] References Cited

U.S. PATENT DOCUMENTS

| 4,247,908 | 1/1981 | Lockhart, Jr. et al. ........ 455/31 X |
| 4,251,865 | 2/1981 | Moore et al. .................... 370/96 X |
| 4,466,001 | 8/1984 | Moore et al. ............. 340/825.47 X |
| 4,750,036 | 6/1988 | Martinez .......................... 358/147 |

*Primary Examiner*—Ulysses Weldon
*Attorney, Agent, or Firm*—Philip P. Macnak; Vincent B. Ingrassia; Anthony Sarli, Jr.

[57] ABSTRACT

Apparatus and method is disclosed for storing and subsequently transmitting later messages for system pagers with acknowledge back capability that nevertheless fail to acknowledge back in the first instance. Addresses are retransmitted for pagers initially failing to acknowledge back on a continuous periodic basis until such acknowledge back is received, at which time the message intended therefor is sent, or a predetermined time period expires.

12 Claims, 5 Drawing Sheets

PAGING TERMINAL APPARATUS WITH MESSAGE STORAGE AND RETRANSMISSION CAPABILITY AND METHOD THEREFOR

This is a continuation of application Ser. No. 121,362, filed Nov. 16, 1987, now abandoned.

BACKGROUND OF THE INVENTION

This invention relates in general to paging systems and, more particularly, to paging terminal apparatus, operable with paging receivers with acknowledge back capability, to store and retransmit messages for eagers initially failing to acknowledge back within a predetermined time period.

Without more, most paging systems experience a loss of page messages under a number of adverse operating conditions. This may be because the pager wearer is out of effective signal range or, perhaps, has taken himself or herself out of service, accidentally or intentionally, by turning off the pager itself. Interference and other adverse signal conditions are still other relevant factors in this regard.

Obviously, what is needed is some method and apparatus capable of preventing the paging messages from being lost. There are, of course, communications systems known in the art which address problems of this nature regarding undeliverable messages to called persons. Telephone answering answering apparatus is but one group of devices intended to preserve, i.e., store messages for later play back. However, such devices require storage at the receiving parties location and would not be amenable to conventional paging systems. Moreover, it requires specific acts and procedures of the called party to retrieve such messages. Other devices or technologies, such as voice mail services and computer mailboxes, are known but exhibit similar or still other disadvantages.

There is one paging product presently known in the art which addresses the problem of uncompleted calls as intended for particular system pagers. It is directed to an arrangement wherein pages are transmitted periodically until a specified telephone number is called by the particular paged party. However, it will be readily appreciated that this nevertheless requires a definitive act by the pager user to terminate this periodic retransmission of the message. If such user feels it is an unwarranted inconvenience, or for whatever reason, the paging message is needlessly retransmitted using valuable system capacity.

Since most paging users are relatively unsophisticated in electrical/electronic technology and pager operations, what is needed is an arrangement to effect the processing and delivery of paging messages automatically, including the storage and retransmission of messages which cannot be properly delivered to a pager at that particular time, all without any action on the pager user himself or herself being required.

SUMMARY OF THE INVENTION

Accordingly, it is an object of the present invention to overcome the deficiencies of the prior art paging systems wherein paging messages are sometimes lost.

A more particular object of the present invention is to provide appropriate methodology and apparatus for effecting a storage and a later retransmission of messages for paging receivers with acknowledge back capability which initially fail to acknowledge a transmitted address. Such storage and retransmission is to be provided on a fully automated basis without further action of the paging user being required.

In practicing the invention, paging terminal apparatus is provided for use with paging receivers having an acknowledge back capability, wherein transmitted but unacknowledged addresses cause messages intended therefore to be stored for later retransmission. The disclosed terminal apparatus includes a paging controller and a transceiver for transmission of pager addresses to the various system receivers followed by a transmission of the intended messages for those pagers acknowledging back such addresses as received and recognized. The controller further includes a provision for storing all intended messages for particular paging receivers for later retransmission where these pagers initially failed to send back an appropriate acknowledgment of its transmitted address. The controller includes a provision for periodically retransmitting the address of the pagers which initially failed to acknowledge its transmitted address and then, further, transmitting stored messages intended therefore upon the controller receiving back an appropriate acknowledgment in response to address retransmission.

BRIEF DESCRIPTION OF THE DRAWINGS

The features of the present invention which are believed to be novel are set forth with particularity in the appended claims. The invention, itself, together with further objects and advantage thereof, may best be understood by reference to the accompanying drawings, in which:

BRIEF DESCRIPTION OF THE PREFERRED EMBODIMENT

Figure 1:
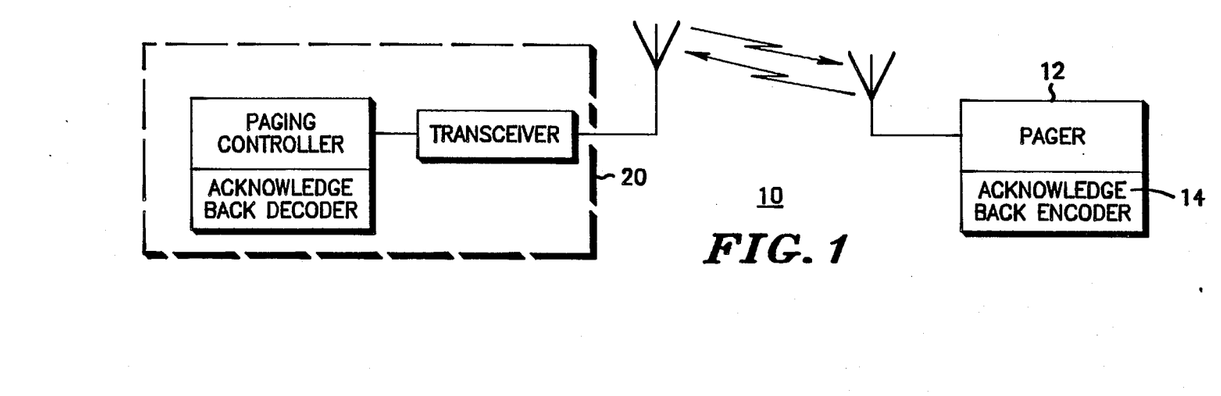
FIG. 1 is a block diagram of a radio communication system in which the present invention may be advantageously utilized.

Referring now to the drawings, a radio communications paging system 10 is shown in which the present invention may be advantageously utilized. The paging system includes terminal apparatus, shown generally at reference 20, and a plurality of paging receivers indicated at 12 as illustrated. It is intended that the associated paging receivers be capable of and provide an acknowledge back feature upon receiving and recognizing its transmitted address. Pagers of this character are, of course, known to those skilled in the art and include an acknowledge back encoder 14 as indicated which is activated when the paging receiver 12 receives and recognizes its particular address. A more detailed description will be set forth in connection with FIG. 3 for the page function and operation.

Figure 2:
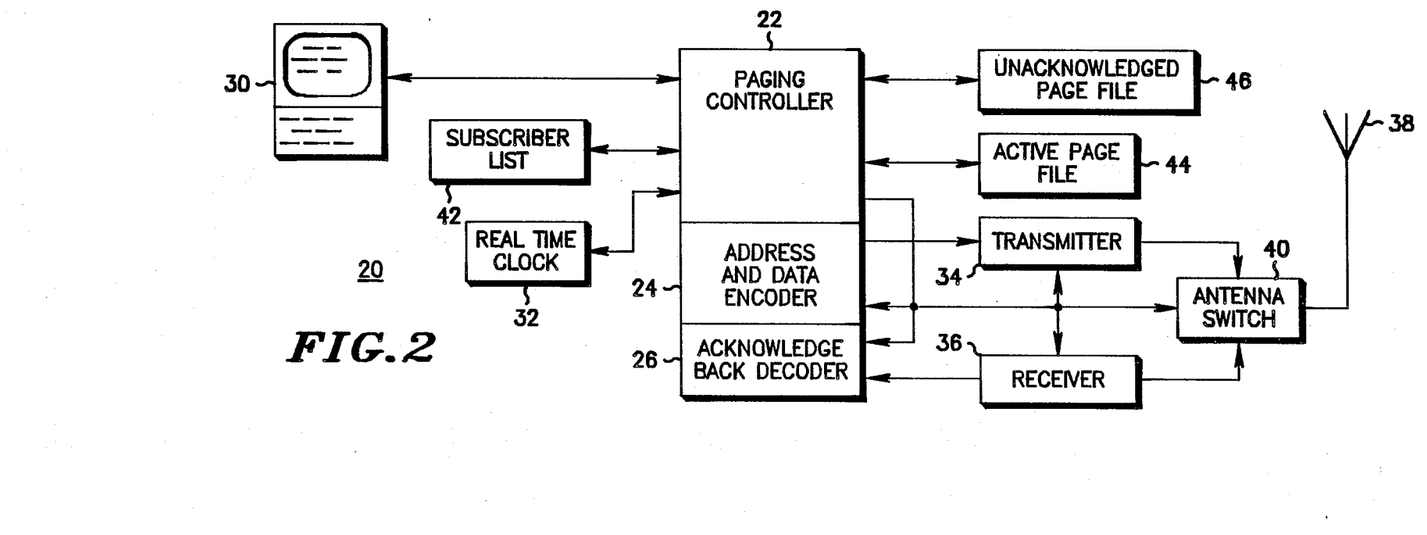
FIG. 2 is a block diagram of a paging terminal and associated apparatus used to send addresses and messages to the system pagers and which include the storage capability provided by the present invention.

The terminal apparatus 20 of FIG. 1 is illustrated in greater detail in FIG. 2 together with the associated auxiliary equipment and the paging files intended to be generated to effect the advantages of the present invention. As therein shown, terminal apparatus 20 includes a paging controller 22 which, inter alia, also includes an address and data encoder 24 and an acknowledge back decoder 26. Associated with the paging controller is an entry device 30, a real time clock 32 as well as a transmitter 34 and receiver 36 operating in connection with an antenna 38 and an antenna switch 40.

Entry device 30 is used to access the paging controller 22 to enter pager ID's (identification numbers) and messages intended therefor for subsequent transmission. The entry device 30 as shown is a video display terminal which is useful for entering alpha numeric messages, and for accessing and updating a subscriber list 42. Subscriber list 42 is a list of all the pagers ID's that are valid in the system 10. Filed under each pager ID in the subscriber list 42 are several items that will be needed by the paging controller 22 to send, or transmit, a page including such information as pager type (acknowledge back or non-acknowledge back), the particular pager address which corresponds to the pager ID, the maximum message storage time of unacknowledged pages, and how often delivery attempts should be made.

As may be appreciated, paging controller 22 is the essential heart of the system 10 and controls the operation of the other associated elements of the paging terminal apparatus. In addition to the subscriber list maintained by controller 22, an active page file 44 is also maintained and comprises a temporary file containing information about the pages being processed by the terminal apparatus 20. The active page file 44 includes the pager identification or ID address, message, and time. Further, an unacknowledged page file 46 is likewise maintained in which undelivered messages are stored. The unacknowledged page file includes the pager ID, the pager address, the message itself, the time of last transmission, and time of entry into the unacknowledged page file. The real time clock 32 is used to supply timing information to the paging controller and for time stamping of undelivered messages in the unacknowledged page file 46.

The address and data encoder 24 accepts addresses and messages supplied to the paging controller 22 by the entry device 30. Address and data encoder 22 then converts this supplied information to the actual transmitted bit patterns in a manner well understood by those skilled in the art. These bit patterns are subsequently transmitted by transmitter 34 through antenna switch 40 and to antenna 38 which radiates the signal energy to the system pagers 12. The "Ack-Back" decoder 26 then detects and processes any acknowledgments returned by the system pagers 12 and provides this information to the paging controller 22. While transmitter 34 modulates an RF carrier frequency with outbound addresses and messages, the receiver 36 demodulates the in-bound modulated RF carrier frequency and supplies recovered data to decoder 26. Upon transmitting an address to a particular pager 12, and then receiving back an acknowledgment therefrom, paging controller 22 immediately transmits the intended message therefor. If an address for a particular paging receiver 12 is transmitted and an acknowledgment back is not received, the message intended for that particular receiver 12 is then stored into the unacknowledged page file 46 for later retransmission on a periodic basis. Such retransmission of that address continues on a periodic basis until an acknowledge back is in fact received at which time the retained message therefor is then sent, or a predetermined time period expires, at which time the information in the unacknowledged page file 46 is purged.

Figure 3:
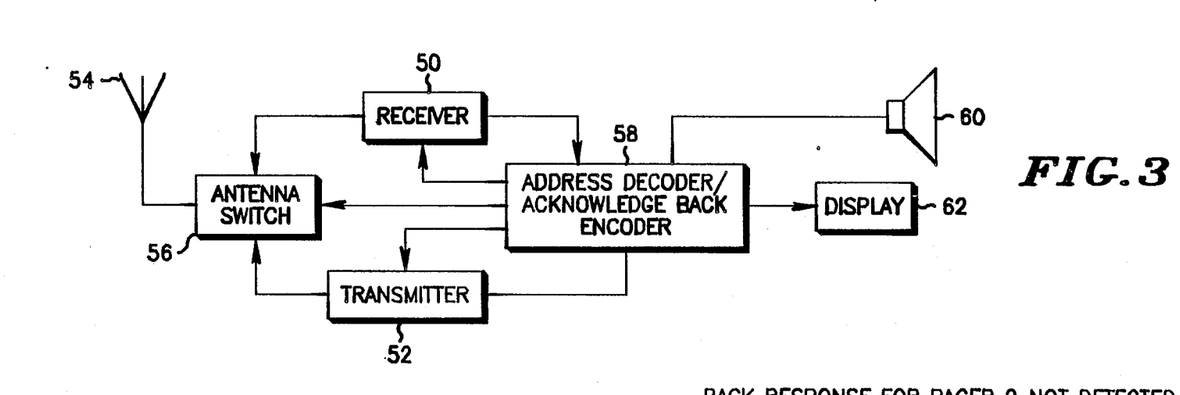
FIG. 3 is a block diagram of a paging receiver with acknowledge back capability intended for operation in the disclosed communication system.
Figure 4A:
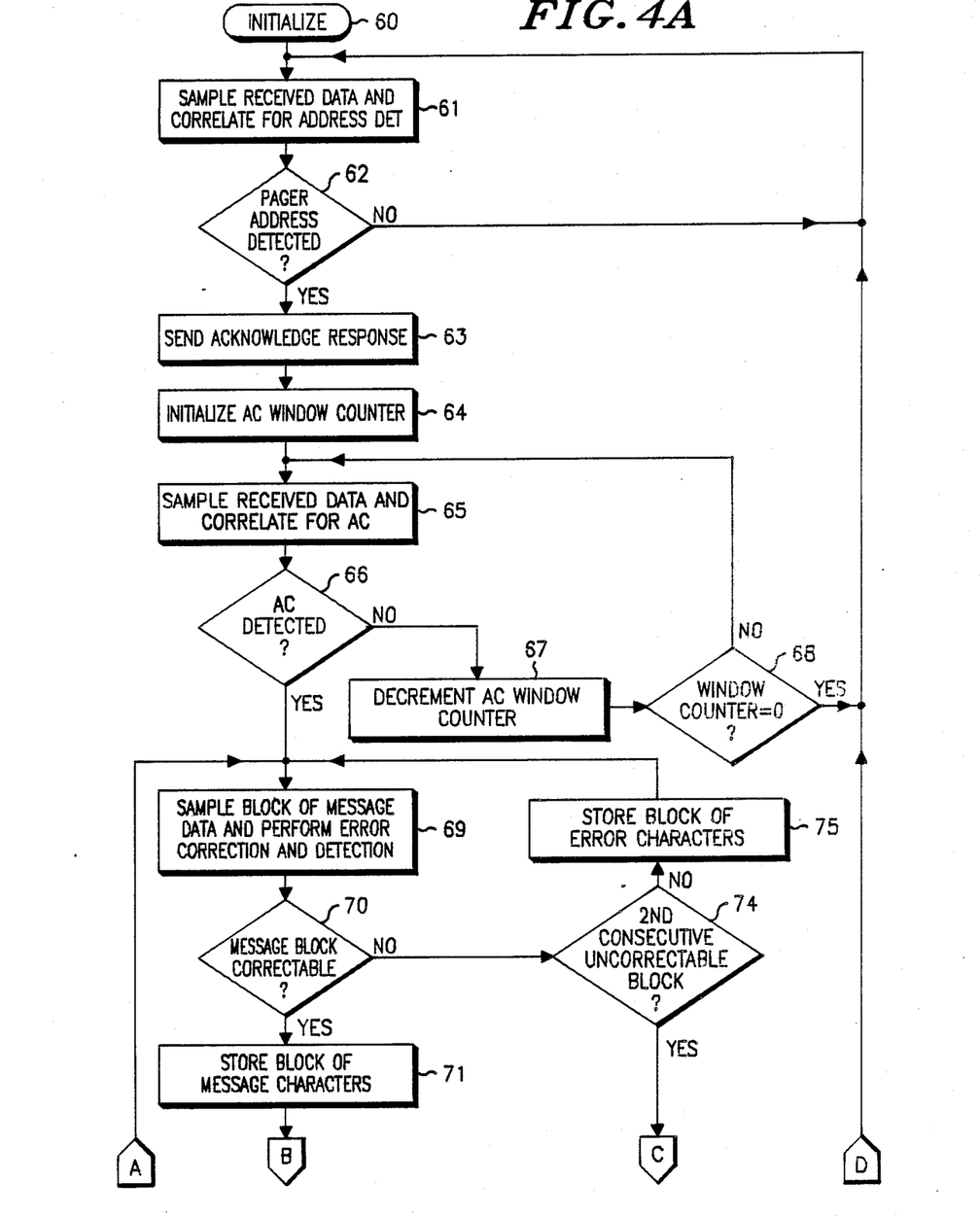
FIGS. 4A and 4B are flow charts which describe the operation of the paging receiver of FIG. 3.
Figure 4B:
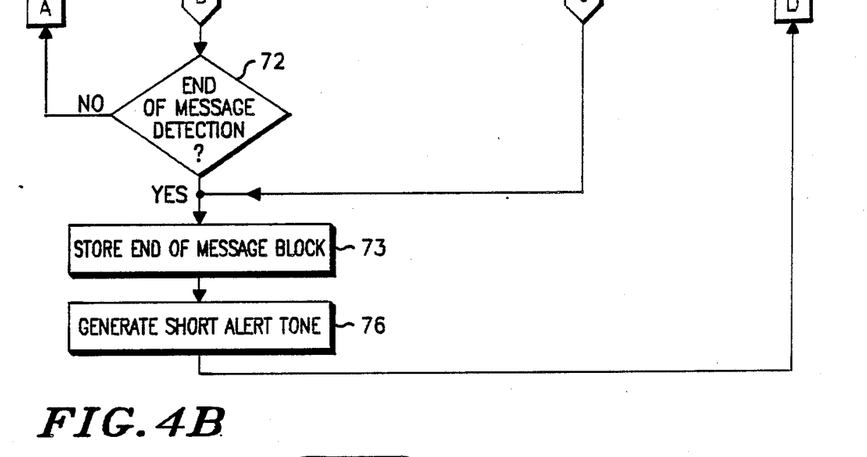

The block diagram of the paging receiver 12 is shown in FIG. 3 and a flow diagram that describes his operation is illustrated in FIG. 4. The pager 12 with acknowledge back capability (hereinafter "Ack-Back"), as illustrated, consists of an RF section 50 and a transmitter section 52. RF signals are coupled to and from the receiver and transmitter sections 50/52 via an antenna 54 and antenna switch 56. Normally, ACK-BACK pager 12 is operated in the receive mode, and the demodulated data output of the pager receiver section 50 is coupled to an included paging address decoder 58.

Paging address decoder 58 examines the recovered data looking for a unique selective calling signal or address that is assigned to pager 12, as illustrated in steps 61 and 62 of the pager flow diagram shown in FIG. 4. This unique address is a precursor for any alphanumeric or voice messages that may be directed to the pager. Once the address has been detected at step 62, the paging address decoder 58 at step 63 generates an appropriate pager automated acknowledge back response (hereinafter "PACK") consisting of particular coded words, which then keys the transmitter 52 which is modulated with the PACK response signal, and the output signal from antenna 54 is transmitted to and is received by the paging controller 22. Following the PACK response, pager 12 returns to its normal receive mode and looks for an activation code (see AC in FIG. 5). However, before beginning to search for this activation code, a window counter (not specifically shown) is decremented at step 67, and at step 68, the count is compared to zero. If the count has decremented to zero, pager returns to the address decode state. If the count has not decremented to zero, the paging decoder 58 continues to look for the activation code detect. The activation code is used to resynchronize the pager for data message decoding.

The message decoding itself is performed in program flow steps 69 through 75 in the conventional manner understood by those skilled in the art and is deemed unnecessary to be described in further detail at this point for that reason and further because it is not critical to an understanding of the present invention. Once, however, a complete message or decodable portion of a message has been received, the paging decoder 58 generates an alert tone and routes this alert tone to the receiver transducer 60. The paging decoder 58 also stores the message in memory (not specifically shown) so that a pager wearer can recall these messages later for viewing on display 62 in the usual manner.

Figure 5:
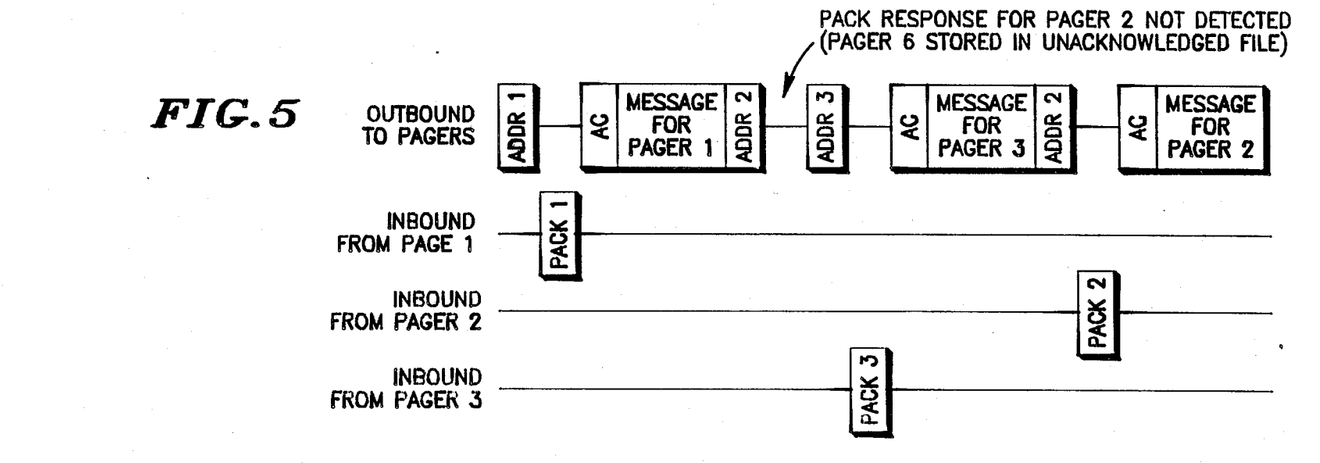
FIG. 5 is a graphic representation of the timing diagram showing the relation between the "outbound" pages of the paging terminal and the "in-bound" acknowledgments of the various system pagers.

The timing diagram of FIG. 5 illustrates the relationship between the "outbound" signals transmitted from paging terminal apparatus 20 to the various system pagers 12, and the "inbound" signals from the pagers 12 acknowledging back to the terminal apparatus (the PACK responses). By way of example, in FIG. 5, pager "No. 1" immediately acknowledges back after receiving its address following which such response is detected by the terminal apparatus and the message intended for that pager may then be transmitted by the terminal. In contrast, pager "No. 2" for some reason does not send back an acknowledgment and, consequently, paging terminal apparatus 22 does not send the message intended for pager "No. 2", but instead stores it in the unacknowledged page file 46. Subsequently, after a message has been successfully sent to pager "No. 3", another attempt is made to address pager "No. 2" which initially failed to acknowledge back. This time, the attempt is indicated as successful, whereupon the message intended for pager "No. 2" is sent by terminal apparatus and the page is then deleted from the unacknowledged page file 46.

The means and the procedure for effecting the signalling procedure and sequence in terms of sending or storing messages, as illustrated and described in FIG. 5, are effected within, and by means of, the paging controller 22 of terminal apparatus 20, as previously described. The procedure/protocol for accomplishing this is set forth with particularity in the flow diagram comprising FIGS. 6a and 6b. The operation begins with an initialize step 80, normally needed only at power up. Step 80 is used to perform functions such as setting up the I/0 ports as inputs and outputs clearing certain memory locations, and perhaps running a self test. After completing the initial power up routine, the controller 22 looks into the unacknowledged page file 46 to determine if it is time to attempt to deliver (retransmit) any unacknowledged pages. If there are either no pages in the unacknowledged page file 46, or there are no pages requiring attention at this time, the program advances to step 82 wherein controller 22 checks to see if any input devices are requesting service. If no input devices are requesting service, the controller returns to step 81. This program flow (step 81 to step 82 to step 81) continues until either there is an input service request (a new page originator needing service), or an unacknowledged page that requires attention.

Figure 6A:
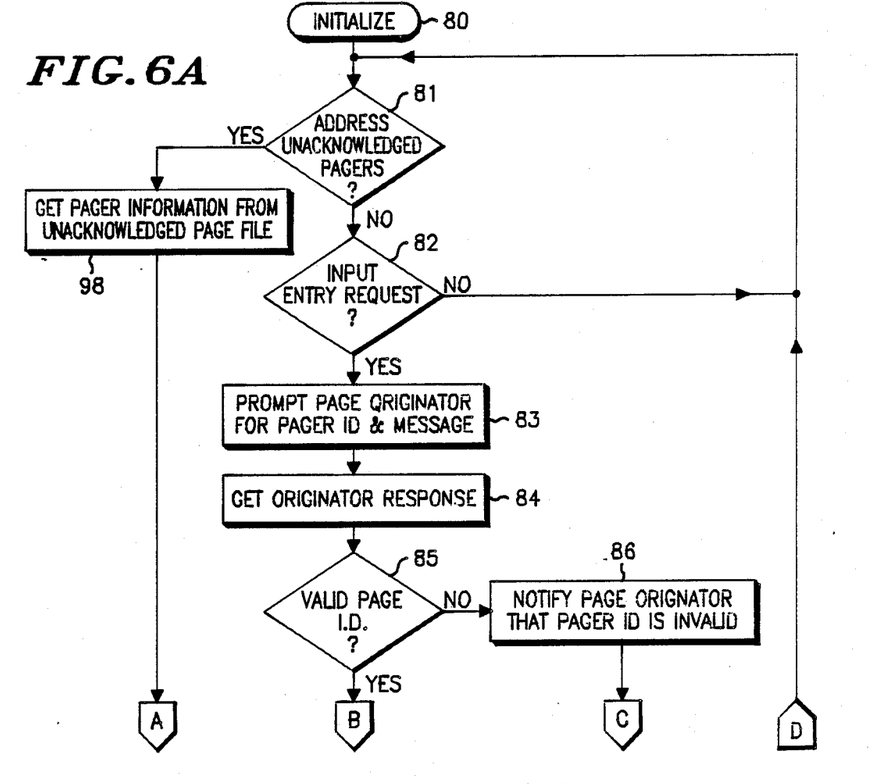
FIGS. 6A and 6B are flow diagrams that describe the operation of the paging terminal including he handling, storage and retransmission of paging messages in accordance with the present invention.
Figure 6B:
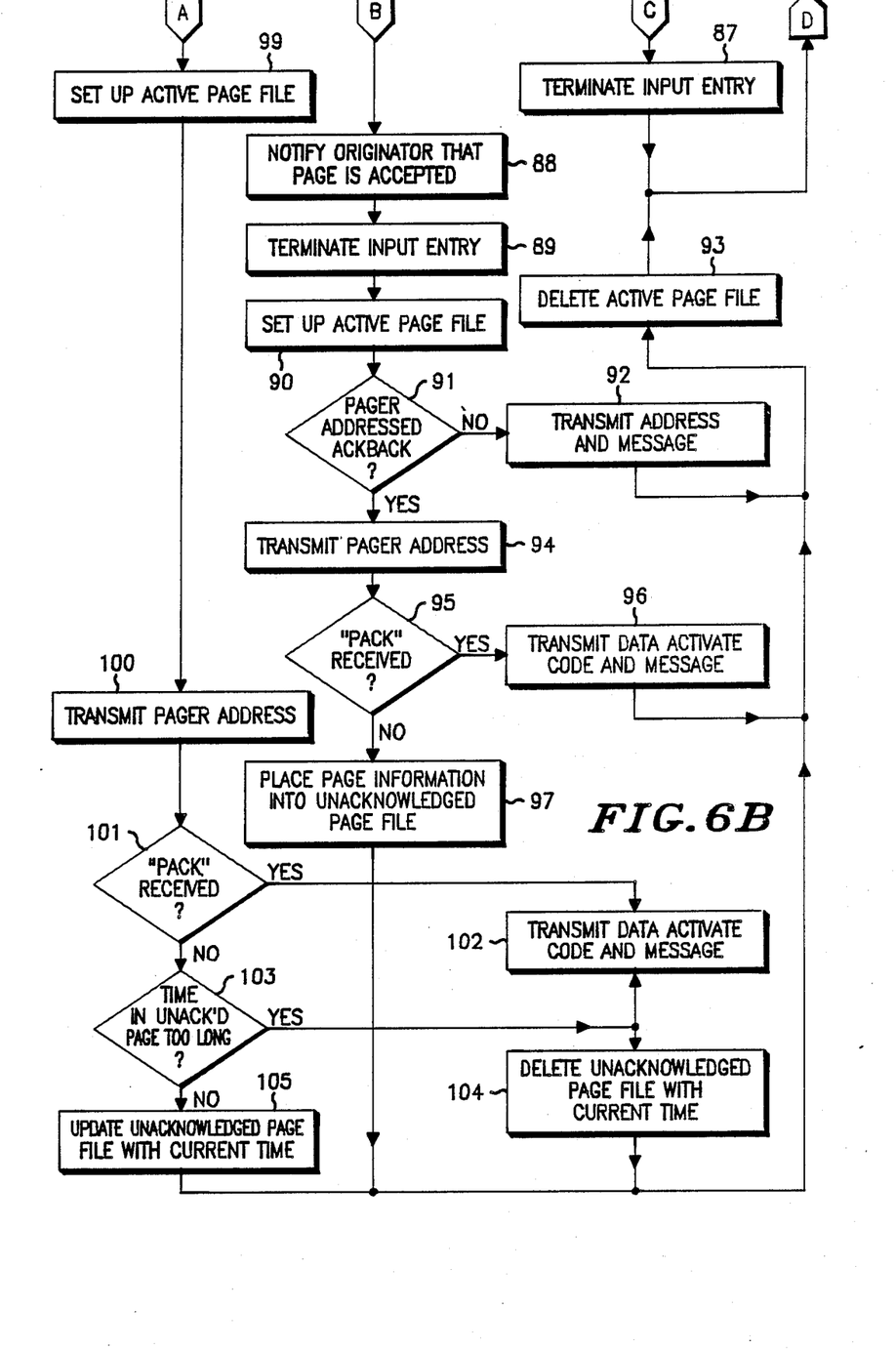

Upon detecting an input service request at step 82, the paging controller 22 prompts the page originator at step 83 for a pager ID and message which may be entered by way of entry device 30, and then hitting a designated key (such as enter) on device 30. Paging controller 22 then reads the originators response at step 84 and looks for a matching pager ID in the subscriber list 42 at step 85. If there is no matching ID, the controller 22 sends a message to entry device 30 at step 86 notifying the originator that the pager ID entered is invalid and the input session is terminated at step 87, whereupon paging controller 22 is returned to step 81 as illustrated. If a matching ID is found at step 85, a message is sent to entry device 30 at step 88 notifying the page originator that the page has in fact been accepted, and the input session may be terminated at 89.

Once the page has been accepted by controller 22, it then sets up active page file 44 at step 90 which contains the pagers ID, the address to which the page will be sent, the message attached to the page, and the current time and date. The address corresponding to a particular pagers ID is located in subscriber list 46. A pager's address and ID may be identical, but generally they are not. Typically a pager has a three-digit pager ID but an address is perhaps six or seven digits in length. The time, of course, is obtained from real time clock 32.

Next, the controller 22 consults subscriber list 46 at step 91 to determine if the pager being addressed is capable of an acknowledge back feature. If the pager being addressed is not one capable of such, the page is sent immediately at step 92, whereupon the active page file entry is deleted at step 93, and paging controller 22 is returned to step 81 in the flow diagram, as illustrated.

If the pager being addressed is capable of acknowledging back, the address is transmitted at step 94 and the paging controller 22 looks for this (PACK) response at step 95. In performing the operations indicated at steps 92 and 94, paging controller 22 may, for example, send information in the form of ASCII characters to the address and data encoder 24 where it is converted to the required binary digits and parity information is added before being applied to transmitter 34 for transmission.

To perform step 95, pager controller 22 turns transmitter 34 off, enables receiver 36, connects antenna 38 to receiver 36 via antenna switch 40 and enables ACK-BACK decoder 26 for a brief window. If the pager address is acknowledged, indicated at step 95, an activation code is sent at step 96 followed by the particular message. As mentioned previously, the activation code is used to resynchronize pager 30 to the data or voice message that follows. Following the successful transmission of the referenced message, active page file 44 will then be purged at step 93, and the pager controller 22 will be returned to step 81 in the flow diagram as illustrated.

If the PACK response is not detected at step 95, the page will then be placed in the unacknowledged page file 46 indicated at step 97. Basically, the contents of the active page file will be placed into the unacknowledged page file with an added piece of information, i.e., the time of the last transmission. Accordingly, pages in the unacknowledged page file 46 will have two pieces of time information associated with them: (1) the time of the initial transmission attempt and (2) the time of the latest transmission attempt. Obviously, after the first transmission attempt, the two pieces of time information will in fact be the same. Following the establishment of the unacknowledged page file indicated at step 97, the program flow again returns to step 81 through step 93 where the active page file 44 is purged of now obsolete and unneeded information.

When attempting to send a previously unacknowledged page as determined at step 81, the paging control of program flow proceeds along the left branch of the flow chart of FIGS. 6a and 6b. At step 98, the page information is retrieved from the unacknowledged page file 46 and, at step 99, the active page file is set up. After setting up an active page file for the, unacknowledged page, the particular pagers address is retransmitted at step 100, and the paging controller 22 looks for the PACK response at step 101. If the PACK response is in fact detected, the activation code and message will be transmitted at step 102. Further, following the successful transmission of a message, the page will then be deleted from the unacknowledged page file at step 104 as no longer being needed, and the paging controller 22 will then be returned to step 81 through step 93

On the other hand, if the PACK response is not received at step 101, the paging controller 22 checks on how long the page has been stored in the unacknowledged page file 46 to determine if the time elapsed has exceeded a set predetermined storage time. If the storage time has been exceeded, the page is then deleted from the unacknowledged page file 46 at step 104, and the paging controller 22 will also then be returned to step 81 through step 93.

If the allocated storage time has not been exceeded, the unacknowledged page file 46 will be updated with the latest transmission time, and the paging controller will be returned to step 81 through step 93.

In this manner, then, a procedure is established whereby the normal paging operations proceeds in the manner well known in prior systems. However, for those pages which are initially unacknowledged, the messages intended therefor will be stored within the paging apparatus 20 for later retransmission, assuming a successful acknowledge back at that time. Periodic attempts will continue to effect a successful completion of a paging sequence within some set predetermined time after which the attempts cease and the information simply deleted from the storage location. It is to be emphasized that such retransmission attempts at reaching an initially unacknowledging pager is effected automatically and without any further action required by the pager user at any time. In this way an entirely new and added dimension is provided for paging systems to effectively and efficiently prevent messages from being lost, by retaining and later retransmitting them, requiring no further action on the part of the pager user himself.

Accordingly, what is claimed is:

1. Paging terminal apparatus, for use with pagers having the capability to acknowledge back receipt of an address identifying the pager, wherein paging messages intended for particular pagers initially failing to acknowledge back address reception may be automatically stored for subsequent transmission later, said terminal apparatus comprising:

means for storing including establishing an active page file into which the addresses of the pagers are temporarily stored, along with the messages intended for the pagers;

means for transmitting, coupled to said means for storing, for initially sending the paper addresses stored in the active page file to the pages; and means for receiving the acknowledge back responses generated by the pagers acknowledging back address reception, said means for transmitting, being responsive to the received acknowledge back responses, for subsequently sending the messages stored in the active page file which are intended for the pagers acknowledging back reception of the initial address transmission, said means for storing further including an unacknowledged page file into which the messages intended for the particular pagers failing to acknowledge back reception of the initial address transmission within a predetermined time period are stored along with the particular pager addresses for subsequent transmission later, and said means for transmitting, periodically retransmitting the addresses of the particular pagers initially failing to acknowledge back, and further transmitting the stored messages intended for each of the particular pagers when such pagers subsequently acknowledge back reception of its retransmitted address.

2. Paging terminal apparatus in accordance with claim 1, wherein said means for transmitting continues to periodically retransmit the addresses to the particular pagers until either an acknowledgement of such transmission is received back therefor, or a predetermined time period expires.

3. Paging terminal apparatus in accordance with claim 1, wherein said unacknowledged page file further includes the time of initial address transmission and the time of last address transmission, if any, for each of the particular pagers.

4. Paging terminal apparatus in accordance with claim 3, wherein the times of initial and last transmission are obtained from a real time clock associated with said paging terminal apparatus.

5. Paging terminal apparatus, for use with pagers having the capability to acknowledge back receipt of an address identifying the pager, wherein paging messages intended for particular pagers initially failing to acknowledge back address reception may be automatically stored for subsequent transmission later, said terminal apparatus comprising:

paging controller means, including memory means for establishing an active page file into which the addresses of the pagers are temporarily stored, along with the messages intended for the pagers;

entry means for entering information into said active page file;

transmitter means, responsive to said paging controller means, for initially sending the pager addresses which are stored in said active page file; and receiver means, for receiving the acknowledge back responses generated by the pagers acknowledging back address reception, said paging controller means being responsive to the received acknowledge back responses for enabling said transmitter means for subsequently sending the messages intended to the pagers upon receiving back an acknowledgement of the initial reception from the pagers, said memory means in said paging controller means further for storing in an unacknowledged page file the addresses and messages intended for the particular pagers which fail to acknowledge back the initial address transmission within a predetermined time period, and said paging controller means further for effecting periodic retransmission of the addresses of the particular pagers failing to acknowledge the initial address transmission, said paging controller means further effecting the transmission of the stored messages to each of the particular pagers that subsequently acknowledge back regarding its retransmitted address.

6. Paging terminal apparatus in accordance with claim 5, wherein said paging controller means continues to periodically effect said transmitter means to retransmit the addresses of the particular pagers until either an acknowledgement of such transmission is received back therefor, or a predetermined time period expires.

7. Paging terminal apparatus in accordance with claim 5, wherein said unacknowledged page file further includes the time of initial address transmission and the time of last address transmission, if any, for each of the particular pagers.

8. Paging terminal apparatus in accordance with claim 7, wherein the time of initial and last transmissions are obtained from a real time clock associated with said paging terminal apparatus.

9. A method for storing and subsequently transmitting messages for pagers having the capability to acknowledge back receipt of an address identifying the pager, wherein particular pagers which fail to effect such acknowledge back upon an initial transmission of its address may be automatically stored for subsequent transmission later, said method comprising the steps of:

temporarily storing the addresses and the intended messages in an active page file;

initially sending the pager addresses to the pagers;

receiving acknowledge back responses from the pagers acknowledging the initial address receptions;

sending the messages intended for the pagers acknowledging back reception of the initial address transmission;

storing, in an unacknowledged page file, the addresses and messages of the particular pagers which fail to acknowledge back the initial reception by such pager within a predetermined time period;

periodically retransmitting the addresses of the particular pagers initially failing to acknowledge back; and transmitting the stored message intended for each of the particular pagers when such pagers subsequently acknowledge back reception of its retransmitted address.

10. The method for storing and subsequently transmitting messages for particular pagers initially failing to acknowledge back address reception in accordance with claim 9, further comprising the step of continuing to retransmit the addresses of the particular pagers initially failing to acknowledge back until an acknowledgement of such transmission is received back therefor, or a predetermined time period expires.

11. The method for storing and subsequently transmitting messages for particular pagers initially failing to acknowledge back address reception in accordance with claim 9, further comprising the step of storing in the unacknowledged page file the time of the initial address transmission and the time of the last address transmission, if any, for each of the particular pagers.

12. The method for storing and subsequently transmitting messages for particular pagers initially failing to acknowledge back address reception in accordance with claim 11, wherein the times of initial and last transmissions are read in from a real time clock.

* * * * *

UNITED STATES PATENT AND TRADEMARK OFFICE
CERTIFICATE OF CORRECTION

PATENT NO. : 4,928,096

DATED : May 22, 1990

INVENTOR(S) : Victoria A. Leonardo; Leonard E. Nelson

It is certified that error appears in the above-identified patent and that said Letters Patent is hereby corrected as shown below:

Column 7, line 36, change "paper" to --pager--.

Column 7, line 37, change "pages" to --pagers--.

Column 8, line 5 change "transmission" to --transmissions--.

Column 9, line 11, after initial insert --address--.

Signed and Sealed this

Twenty-seventh Day of August, 1991

Attest:

HARRY F. MANBECK, JR.

Attesting Officer

Commissioner of Patents and Trademarks